United States Patent Office 3,576,831
Patented Apr. 27, 1971

3,576,831
ACID HYDROLYZED PHOSPHATIDES
Paul F. Davis, Addison, Ill., assignor to The Central
Soya Company, Inc., Chicago, Ill.
No Drawing. Filed Mar. 6, 1967, Ser. No. 620,644
Int. Cl. A23j 7/02
U.S. Cl. 260—403                          11 Claims

ABSTRACT OF THE DISCLOSURE

The controlled partial acid hydrolysis of soybean phosphatides to give modified products characterized by improved oil-in-water emulsification and improved wetting and stabilizing properties for the dispersion of fat-containing powders (both edible and industrial) in aqueous media.

---

The source material for the modified phosphatides with which this invention is concerned is available commercially from vegetable sources (i.e., the soybean) and are commonly referred to as "lecithins" or "soybean lecithins." When the terms "lecithin" and "soybean lecithin" are used hereinafter, reference is made to the article of commerce and not to phosphatidyl choline. In addition to phosphatidyl choline, soybean lecithin contains phosphatidyl ethanolamine, phosphatidyl inositol, other phosphatides, carbohydrates, sterols, sterol glycosides, etc. Such products may contain 25% to 50% of soybean oil or other carriers or diluents, or may be essentially free of carriers or diluents.

The surface-active properties of soybean lecithin have been utilized for many years to provide wettable powders and for oil-in-water emulsification. Notwithstanding this long usage, there are certain powdered materials, generally containing fat, wherein the wetting properties of soybean lecithin are not satisfactory. It has been common practice to mix other surface-active agents, such as polyoxyethylene derivatives of sorbitan fatty acid esters, with soybean lecithin to give compositions having acceptable wetting properties when dispersed on powdered materials. A similar situation is encountered when soybean lecithin is used to prepare oil-in-water emulsions. In certain emulsions, soybean lecithin and the fat phase will form only water-in-oil type emulsions when dispersed in an aqueous phase; these emulsions separate their components rapidly, with the water-in-oil emulsions being present as cream layers on the aqueous phase.

A primary objective of the present invention is to provide a modified phosphatide with improved wetting properties when dispersed on the surface of powdered materials.

Another primary objective is to provide a modified phosphatide useful for the preparation of oil-in-water emulsions in systems containing calcium and/or magnesium ions.

Another objective is to provide a modified phosphatide which is of fluid consistency at neutral pH ranges without the addition of fatty acids.

These and other objects and advantages of the invention will be apparent from the following detailed description of the invention. In general, the invention comprises the controlled partial hydrolysis of soybean phosphatides using aqueous hydrochloric, sulfuric, or phosphoric acids or mixtures of the same. The two main products of the hydrolysis are lysophosphatides and fatty acids. The improvement in emulsification properties of the modified phosphatides is primarily due to the formation of lysophosphatides whereby the hydrophilic-lipophilic balance of the original intact phosphatide is made more hydrophilic by hydrolytic cleavage of one of the two fatty acid esters in the phosphatide moiety. The products of the hydrolysis are identified and qualitatively determined by uni-dimensional and two-dimensional TLC (thin-layer chromatography) on silica gel. The TLC observations indicate that lysophosphatides and fatty acids are the primary products obtained; therefore, acid value determinations are used as a measure of the extent of the hydrolysis. It is not necessary or desirable to convert all of the phosphatides to lyso derivatives during the hydrolysis. Analyses indicate that when as little as about 10% of the phosphatides are hydrolyzed to the lyso derivatives, marked improvements in wetting and emulsification properties may be obtained. To obtain hydrolyzed products having good stability characteristics (no separation of components during storage), as well as improved wetting, emulsifying, stabilizing activity, it is preferred that from about one-half to about two-thirds of the phosphatides be converted to the lyso derivatives. The hydrolysis may be carried further than about two-thirds of the way to obtain products acceptable from a stability and activity standpoint; however, TLC analysis indicates that some glyceryl phosphoryl choline and glyceryl phosphoryl ethanolamine are formed under these circumstances.

Acidic, partially-hydrolyzed soybean lecithin products confer good wetting properties to fat-containing powdered materials. The best emulsification and stabilizing properties are developed in partially hydrolyzed phosphatides which have been treated with a base to at least neutralize the added inorganic acid. Further quantities of base can be added to adjust the pH to about the pH of the starting lecithin; however, the addition of excess quantities of a base such as sodium hydroxide should be avoided as this may lead to the formation of a product which is of plastic consistency when stored at about 25° C. This may be undesirable from a handling standpoint, and in case of pH adjustment to greater than about 8.0, may lead to the development of undesirable odor components.

Acid hydrolysis of phosphatides has been done for a number of years. The products of the virtually complete hydrolysis are analyzed to aid in the determination of the original phosphatide composition [Wittcoff, H., The Phosphatides, Reinhold Publishing Corp., New York, N.Y. (1951) pages 15, 16, 165 to 168]. However, none of the workers in this field have appreciated or taught that mild acid hydrolysis is useful for the preparation of phosphatide compositions having improved surface-active properties.

Lysophosphatides have been known for some time. When these phosphatides have been desired, enzymatic methods have been used for their prepartion [loc. cit— p. 99 to 115]. The enzymes used are obtained from a number of sources and are designated as lecithinases or phospholipases A, B, C, and D. Lecithinases A and B are the enzymes which hydrolyze fatty acids from the phosphatides. The present invention offers an alternative route for the preparation of lysophosphatides at a much lower price than ce be accomplished by enzymatic procedures. The specificity of the mild acid hydrolysis for fatty acid removal is unknown.

The following examples are illustrative of procedures found useful for the preparation of partially hydrolyzed soybean lecithin and demonstrate the improvements in surface-active properties obtained.

Example 1

A sample of commercial natural-grade soybean lecithin having an A.I. (acetone insolubles) content of 68.1% was emulsified with distilled water to give an emulsion containing 20% water. Commercial concentrated hydrochloric acid (36.5 to 38.0% HCl) was added in the amount of 2.27%, based on the lecithin dry weight, and the emulsion was hydrolyzed at 63° C. Samples were removed during the hydrolysis and vacuum-dried without neutralization and after partial neutralization of acidity with aqueous sodium hydroxide solution.

The ability of the modified products to form oil-in-water type emulsions under adverse conditions was determined by dissolving 10% by weight of the lecithin products in a fat blend consisting of 50% lard-50% beef tallow and pouring the lecithin-fat mixture into 100 grain hardness water (0.252% calcium chloride dihydrate) at 75° C. The system was stirred intermittently with a thermometer until an oil-in-water type emulsion formed or until the temperature dropped to 50° C. The higher the temperature at which an emulsion forms, the better the product was as an oil-in-water type emulsifier.

The wetting and emulsion stabilizing properties of the products were determined in a system consisting of 2.0% lecithin, 10.0% beef tallow, and 88.0% NFDM (non-fat dry milk) which was dry-mixed at 50° C. and stored at 25° C. for several weeks before testing. Wetting time was determined by placing 10.0 grams of the dry mix on the surface of 92 to 93 ml. of 25° C. tap water (7.5 grains hardness) followed by controlled mixing. The time in seconds required for complete wetting of the dry mix was the wetting time. After two minutes mixing, the dispersion was poured into 100 ml. graduates and observed for separation of components after 5, 10, and 30 minutes. With this formulation, the only separation observed was a top layer reported as "cream."

Selected analyses and emulsion test results are shown in Table 1 below.

TABLE 1.—HYDROLYSIS OF SOYBEAN PHOSPHATIDES WITH 2.27% CONCENTRATED HYDROCHLORIC ACID AT 63° C.—ANALYSIS AND EMULSIFYING PROPERTIES OF PRODUCTS

| Lecithin identification | Percent A.I. | pH (1% emulsion) | Acid value | Viscosity at 80° F., cps. | Emulsion test, ° C. |
|---|---|---|---|---|---|
| 1. Natural-grade | 68.1 | 7.49 | 25.1 | (¹) | (²) |
| 2. Hydrolyzed | 61.3 | 3.64 | 53.9 | 11,600 | (²) |
| 3. Hydrolyzed | 58.9 | 3.63 | 56.6 | 9,900 | (²) |
| 4. Hydrolyzed | 57.3 | 3.60 | 59.9 | 8,100 | 62 |
| 5. Hydrolyzed | 55.3 | 3.60 | 63.4 | 5,500 | 71 |
| 6. Hydrolyzed | 53.0 | 3.57 | 69.3 | 3,100 | 74 |
| 7. Hydrolyzed | 50.3 | 3.54 | 73.7 | 2,000 | 74 |
| 8. No. 2 with NaOH | 65.0 | 7.28 | 36.0 | 16,750 | 72 |
| 9. No. 3 with NaOH | 63.9 | 7.55 | 36.3 | 20,500 | 74 |
| 10. No. 4 with NaOH | 61.3 | 7.64 | 35.0 | 17,250 | 75 |
| 11. No. 5 with NaOH | 61.6 | 7.78 | 36.0 | 15,250 | 75 |
| 12. No. 6 with NaOH | 61.0 | 7.88 | 37.2 | 51,000 | 75 |
| 13. No. 7 with NaOH | 60.8 | 7.89 | 38.4 | (¹) | 75 |

¹ Plastic.
² No emulsion.

Addition of 2.27% concentrated aqueous hydrochloric acid raised the acid value 13.0 units, so the initial hydrolysis started at an acid value of 38.1. Emulsion forming properties for the unneutralized samples started after an acid value increase of about 21 units, and improved as the hydrolysis continued. All of the partially neutralized samples functioned satisfactorily in this test. The natural-grade lecithin used as the starting material did not emulsify this system and did not emulsify a less adverse system wherein distilled water was used in place of 100 grain hardness water.

Note that as the hydrolysis continued, the products became less viscous. Fluidity was retained by partial neutralization of acidity, except for sample No. 13 which was neutralized too far. Other samples have been hydrolyzed to this extent in a similar manner but neutralized with base to a lower pH (7.5). These products remain fluid. The samples listed in Table 1 were used as surface-active agents in the dry mix formulation given above with the results reported in Table 2.

TABLE 2.—WETTING AND EMULSION STABILIZING PROPERTIES OF PARTIALLY HYDROLYZED SOYBEAN PHOSPHATIDES

| Lecithin identification | Wetting time, seconds | Ml. "cream" after time-minutes | | |
|---|---|---|---|---|
| | | 5 | 10 | 30 |
| 1. Natural-grade | >120 | 12 | 16 | 17 |
| 2. Hydrolyzed | 30 | 14 | 17 | 15 |
| 3. Hydrolyzed | 25 | 14 | 17 | 15 |
| 4. Hydrolyzed | 20 | 9 | 12 | 12 |
| 5. Hydrolyzed | 25 | 7 | 10 | 12 |
| 6. Hydrolyzed | 15 | 10 | 15 | 14 |
| 7. Hydrolyzed | 25 | 6 | 9 | 12 |
| 8. No. 2 with NaOH | 20 | 5 | 7 | 8 |
| 9. No. 3 with NaOH | 10 | 4 | 6 | 7 |
| 10. No. 4 with NaOH | 25 | 4 | 6 | 7 |
| 11. No. 5 with NaOH | 20 | 4 | 5 | 6 |
| 12. No. 6 with NaOH | 30 | 4 | 6 | 7 |
| 13. No. 7 with NaOH | 20 | 4 | 5 | 6 |

The wetting time was greatly improved over the natural-grade lecithin with all of the hydrolyzed products. The stabilizing effects of samples No. 2 and 3 (unneutralized) were no better than the control. After partial neutralization of acidity, a marked improvement in the stability of the dispersion was obtained.

The analyses and tests reported in Tables 1 and 2 demonstrate that a marked change in phosphatide characteristics has been accomplished by partial hydrolysis with hydrochloric acid. No separation of components has been found when the modified phosphatide products were stored at 25 to 27° C., except for samples No. 6 and 7 which formed a sediment.

Example 2

A sample of natural-grade unbleached plastic soybean lecithin (A.I.=70.5) was emulsified with water to give an emulsion containing 20% water. Concentrate hydrochloric acid was added to lower the pH to 3.5, and the emulsion was hydrolyzed at 63° C. Samples were removed after the acid value had increased by 7.1 and 12.1 mg. potassium hydroxide per gram and then the acidity was partially neutralized with aqueous sodium hydroxide solution before vacuum drying to give products with pH's of about 6.7. Both products had wetting and emulsion stabilizing properties which were better than the initial natural-grade lecithin when used in the dry mix of Example 1. The first product (7.1 acid value increase) would not emulsify fat into 100 grain hard water; the second product (12.1 acid value increase) formed an emulsion at 67° C. in 100 grain water. This example illustrates that a marked improvement in the wetting, stabilizing, and emulsifying properties of soybean lecithin are accomplished by limited hydrolysis using hydrochloric acid. Both lecithin products were fluid.

Example 3

This example illustrates in more detail the effect of partial neutralization of acidity on composition and properties of the hydrolyzed products. A sample of natural-grade unbleached plastic soybean lecithin (A.I.=68.5) was emulsified with water to give an emulsion containing 20% water. Hydrochloric acid was added to give a pH of 3.60 and the hydrolysis was conducted at 55° C. for 22 hours. An acid value increase of 22.7 units due to the hydrolysis was obtained. Varying quantities of sodium hydroxide were added to samples which were then vacuum dried; analyses shown in Table 3.

TABLE 3.—EFFECT OF EXTENT OF ACIDITY NEUTRALIZATION ON PROPERTIES OF PARTIALLY HYDROLYZED SOYBEAN PHOSPHATIDES

| Sample identification | Percent A.I. | pH (1% emulsion) | Acid value | Viscosity at 80° F., CPS. | Appearance | Emulsion test, ° C. |
|---|---|---|---|---|---|---|
| 1. Natural grade | 68.5 | 7.40 | 24.5 | (1) | Slightly hazy; melted | (2) |
| 2. No NaOH | 55.0 | 3.56 | 59.1 | 4,400 | Cloudy | 58 |
| 3. 0.93% NaOH | 58.6 | 6.59 | 46.1 | 6,800 | Hazy | 75 |
| 4. 1.14% NaOH | 57.5 | 7.03 | 44.5 | 7,600 | do | 75 |
| 5. 1.36% NaOH | 58.6 | 7.29 | 41.4 | 9,500 | Slightly hazy | 75 |
| 6. 1.57% NaOH | 58.2 | 7.56 | 38.3 | 10,000 | do | 75 |
| 7. 1.79% NaOH | 59.1 | 7.78 | 35.5 | 10,700 | do | 75 |

1 Plastic.
2 No emulsion.

Addition of sodium hydroxide to neutralize the added hydrochloric acid (No. 3) gave the most marked change in A.I. content, clarity, and emulsifying properties. The stabilizing effect on a dry mix dispersed in water followed the same trend; sample No. 2 was no better than the control (No. 1), and samples No. 3 through 7 gave good stability to the dispersed dry mix. This indicates that a relatively wide pH range can be used to provide partially hydrolyzed lecithin products having improved properties for preparation of oil-in-water type emulsions and for dispersion and stabilization of powdered materials in aqueous media.

Samples No. 1, 2, and 5 were analyzed by two-dimensional thin-layer chromatography. Sample No. 1 showed only traces of lysophosphatides and a small fatty acid spot. Samples No. 2 and 5 had large fatty acid spots and large concentrations of lysophosphatides. The area of spots identified as phosphatidyl ethanolamine, phosphatidyl choline, and phosphatidyl inositol were reduced in samples No. 2 and 5 when compared with the chromatogram of sample No. 1.

Bases other than sodium hydroxide have been used to neutralize the partially hydrolyzed soybean phosphatides. These include potassium hydroxide and calcium hydroxide. The use of potassium hydroxide gives products equivalent in properties to those using sodium hydroxide. Calcium hydroxide, when used as the neutralizing base, gives products marginally inferior to the sodium hydroxide neutralized products when used in the test media of Example 1.

Addition of other basic materials such as basic salts, i.e., sodium carbonate or bicarbonate gives products equivalent to sodium hydroxide addition.

Ammonium hydroxide may be added as the base described above. However, this leads to loss of ammonia during drying. A preferred method for neutralization with ammonia is to add dry ammonia to the dry hydrolyzed lecithin to adjust the pH, giving no loss of ammonia. Neutralization with ammonia does not effectively reduce the acid value of the products as do the other bases and basic salts disclosed.

Example 4

Variables affecting the rate of soybean lecithin hydrolysis with hydrochloric acid are given in Table 4.

TABLE 4.—VARIABLES AFFECTING THE RATE OF HYDROLYSIS OF SOYBEAN PHOSPHATIDES WITH CONCENTRATED COMMERCIAL HYDROCHLORIC ACID

| pH 1% emulsion | Moisture content a | Temp., °C | Time, hours | Acid value increase b |
|---|---|---|---|---|
| 1. 3.3 | 0.8 | 50 | 40 | 4.6 |
| 2. 3.3 | 5 | 50 | 40 | 22.4 |
| 3. 3.3 | 10 | 50 | 16 | 17.7 |
| 4. 3.3 | 20 | 50 | 16 | 20.4 |
| 5. 3.3 | 30 | 50 | 16 | 20.7 |
| 6. 3.3 | 40 | 50 | 16 | 28.9 |
| 7. 3.3 | c50 | 50 | 22.5 | 20.6 |
| 8. 4.0 | 20 | 63 | 17 | 6.5 |
| 9. 3.6 | 20 | 70 | 4 | 12.4 |
| 10. 3.45 | 20 | 63 | 7 | 12.1 |
| 11. 3.3 | 20 | 63 | 17 | 40.0 |
| 12. 3.0 | 20 | 63 | 17 | 44.0 |
| 13. 3.0 | 17 | 63 | 3 | 20.9 |
| 14. 3.0 | 17 | 25 | 51 | 22.7 | a Before addition of conc. HCl.
b Due to hydrolysis.
c About 5% moisture separated after HCl addition.

An acid value increase of 19 to 25 mg. of potassium hydroxide per gram (due to hydrolysis) is preferred for product stability and activity in the applications and testing reported in the previous examples; however, products hydrolyzed to a lesser extent show improved activity compared to natural-grade lecithin as disclosed in Example 2. The maximum acid value increase achieved, i.e., 44 mg. KOH represents the limit of the partial hydrolysis—being substantially less than that achieved with complete hydrolysis practiced in the prior art in analytical procedures. The data reported in Table 4 is a useful guide to determine reaction conditions necessary for hydrolysis in a given period of time.

A maximum pH (measured in a 1% aqueous emulsion) of about 4.0 (Table 4, No. 8, 1.57% conc. HCL added) is the practical limit for conducting the hydrolysis. The hydrolysis does proceed at pH's as high as 5.5 (0.65% conc. HCL), but at a rate lower than that reported. The lowest pH used has been 3.0 (Nos. 12, 13 and 14). Hydrolysis is quite rapid at this pH (3.6% conc. HCL) and proceeds at a useful rate at temperatures as low as 25° C. (No. 14). The hydrolysis can be conducted at pH's lower than 3.0 such as 2.0 but this leads to formation of more salt during neutralization with base which may be undesirable for certain applications. The salt can be removed by dialysis, if desired, before drying the hydrolyzed, partially neutralized product.

The effect of moisture content (before conc. HCL addition) is shown in samples No. 1 through 7. Dry lecithin (less than 1% moisture) is hydrolyzed slowly by concentrated hydrochloric acid. A more useful hydrolysis rate is obtained at 5% moisture (No. 2), and at moisture levels of 10 to 50%, the reaction rate is essentially constant. Hychloric acid addition to an emulsion containing 50% water caused separation of about 5% of water. This indicates that no purpose is served by having more than about 45% water in the original emulsion.

Hydrolyses have been conducted at temperatures as low as 25° C. and as high as 70° C. A temperature of about 50° C. is preferred as the hydrolysis proceeds at a rate useful for commercial production purposes with less objectionable odor and color formation than is developed at higher temperatures. The odors developed during hydrolysis at temperatures higher than about 60° C. are described as "burnt sugar," and may arise from changes in the carbohydrates contained in the soybean phosphatides. Color changes (darkening) are ascribed to the reaction of the strong acid with carotenoids and to carbohydrate reactions (browning).

Example 5

The color of soybean lecithin may be determined using the Gardner 1953 color standards. Hydrolysis of lecithin emulsion containing 20% water with hydrochloric acid at pH=3.3 and at 50° C. increases the color about 2 units (from 15 to 17—). Treatment of the lecithin, before or after the hydrolysis, with 0.3% benzoyl peroxide result in a color of 15— about the same as the original color. Treatment with higher percentages of benzoyl peroxide (0.7%) gave marginally lighter colors; a Gardner-Hellige color of 14. These colors are stable on storage at about 30° C. and lower temperatures and do not revert to give darker colored products. Removal of natural pigments by treatment with activated clays and/or carbons before hydrolysis is also useful to stop color changes during the hydrolysis.

Color developed by darkening of the carbohydrates during the hydrolysis is lightened by treatment with about 0.25% sulfur dioxide (as sulfite or bisulfite) after the hydrolysis. The color was lightened from 17 to 15 by this treatment. Oxidative bleaching using hydrogen peroxide after the hydrolysis is not satisfactory as the color is not stable but reverts on storage at 30° C. or lower temperatures to a dark brown color (18+ on the Gardner-Hellige scale).

Treatment of the lecithin with lower concentrations of benzoyl peroxide (0.1%) lightens the color, but not as much as with higher concentrations.

The method used for incorporation of commercial concentrated hydrochloric acid into the soybean lecithin is not critical. The following methods have been successfully used: (1) addition of hydrochloric acid to dry lecithin (0.8% H₂O) followed by water; (2) addition of a mixture of hydrochloric acid and water to dry lecithin; (3) addition of hydrochloric acid to lecithin emulsion. These methods were all used for treatment of the lecithin after removal from most of the soybean oil by normal degumming procedures.

Other procedures may be used to add hydrochloric acid to lecithin. A particularly satisfactory procedure is to include HCL in the water used in degumming non-degummed soybean oil.

Example 6

3,000 grams of non-degummed soybean oil (phosphorus=576 p.p.m.) was heated to 70° C., 88.0 ml. of distilled water and 2.27 ml. of concentrated hydrochloric acid (37% HCL) were added and agitated for 20 minutes at 65 to 70° C. The resulting emulsion was centrifuged at 65° C. to give a degummed soybean oil having a phosphorus content of 38 p.p.m. and a lecithin emulsion having a pH=3.70. The run was repeated with one change; the temperature was reduced to 30° C. before centrifugation. The degummed soybean oil had a phosphorus content of 1.5 p.p.m. and the lecithin emulsion had a pH=3.5 (measured in a 1% emulsion). Normal laboratory degumming with distilled water produced a degummed soybean oil with 95 p.p.m. phosphorus and a lecithin emulsion with a pH=7.4. Degumming with hydrochloric acid to give a lecithin emulsion having a pH higher than 4.0 can also be done. Phosphorus content is reduced in the degummed soybean oil to less than about 40 p.p.m. and hydrochloric acid is added to further reduce the pH of the lecithin emulsion to about 3.3 before hydrolysis. This two-step procedure for hydrochloric acid addition is of benefit in that a low-phosphorus content degummed oil is obtained which has a low acid value, i.e., little hydrolysis occurs during the degumming step. Two main benefits are derived from a low-phosphorus degummed soybean oil: (1) the oil does not support the growth of micro-organisms as well during storage (less acidity increase); (2) the oil is easier to refine, particularly in batch systems using caustic, because there are less phosphatides to emulsify neutral oil. This latter property of low-phosphorus degummed oil leads to lower refining losses in batch refining using caustic, but not necessarily in continuous refining using sodium carbonate.

The products listed in the examples above were prepared from high A.I. soybean lecithin (68.1% minimum). For fluidity control, it is preferred that a high A.I. lecithin be used as a starting material for the hydrolysis, and after hydrolysis and neutralization (if desired), the product is analyzed and diluted as required to obtain the desired fluidity. In Example 1, Table 1, samples No. 8 through 11 were diluted with degummed soybean oil to 57.0% A.I. All products after the dilution had viscosities of less than 10,000 cps. at 80° F., which is desirable from a handling standpoint, and no separation of components occurred on storage at 25 to 30° C. Further, sample No. 5 (Example 3, Table 3) was diluted to 51% A.I. with degummed soybean oil and had a viscosity of about 2,000 cps. at 80° F. No separation of components occurred when stored at 1° C. at 0.3% and at 0.8% moisture for several weeks. When again stored at 25° C., the products came back to their original viscosity without separation of components occurring, thus demonstrating good stability. When hydrolyzed, partially neutralized lecithin products are desired at about 51.0% A.I., a natural-grade soybean lecithin having an A.I. as low as about 60% can be used as starting material.

Example 7

This example illustrates that sulfuric and phosphoric acids can be used as replacements for hydrochloric acid to prepare partially hydrolyzed soybean lectithin products having improved surface-active properties.

Natural-grade plastic unbleached soybean lectithin was emulsified with aqueous hydrochloric, sulfuric, and phosphoric acids giving emulsions containing 20% water and having pH's at 3.3 (0.78% HCL, 1.23% H₂SO₄, 2.8% H₃PO₄). These emulsions were hydrolyzed at 50° C. After 22 hours, the phosphoric acid hydrolysis had increased the acid value 21.4 mg. KOH/g. After 24 hours, the sulfuric acid and hydrochloric acid hydrolyses had increased the acid values 22.6 and 20.4 units, respectively. The hydrolyses proceeded at about the same rate with the three inorganic acids when used to give the same pH.

The emulsions were treated with aqueous sodium hydroxide solution to partially neutralize acidity; then vacuum dried.

TABLE 5.—ANALYSIS AND SURFACE-ACTIVE PROPERTIES OF SOYBEAN PHOSPHATIDES HYDROLYZED WITH HYDROCHLORIC, SULFURIC AND PHOSPHORIC ACIDS

| Lecithin identification | Percent A.I. | pH (1% emulsion) | Acid value | Viscosity at 80° F., cps. | Emulsion tests, ° C. | Wetting time, seconds | Mls. "cream" after time, minutes | | |
|---|---|---|---|---|---|---|---|---|---|
| | | | | | | | 5 | 10 | 30 |
| 1. Natural-grade | 65.6 | 7.50 | 21.4 | (¹) | (²) | 90 | 15 | 17 | 18 |
| 2. HCl hydrolysis, NaOH neutralized | 58.5 | 7.39 | 36.6 | 5,950 | 75 | 25 | 5 | 7 | 3 |
| 3. H₂SO₄ hydrolysis, NaOH neutralized | 56.0 | 7.13 | 39.2 | 4,940 | 75 | 30 | 6 | 8 | 6 |
| 4. H₃PO₄ hydrolysis, NaOH neutralized | 60.0 | 7.28 | 52.1 | 6,300 | 75 | 45 | 10 | 14 | 19 |

¹ Plastic.
² No emulsion.

The data given in Table 5 indicates that hydrolyses with hydrochloric and sulfuric acids give partially hydrolized products which are essentially equivalent. Thus sulfuric acid could be used to hydrolyze products for use in industrial emulsion applications; for edible use hydrochloric acid is the acid of choice. Products hydrolyzed with phosphoric acid have good emulsification properties, and have improved properties for wetting and stabilizing fat-containing powders when compared to natural-grade lecithin. Phosphoric acid hydrolyzed products are not equivalent to those hydrolyzed using hydrochloric and sulfuric acids for wetting and stabilizing fat-containing products, and the latter two acidic reactants are preferred.

While in the foregoing specification a detailed description of the practice of the invention has been set down for the purpose of illustration, many variations in the details herein given may be made by those skilled in the art without departing from the spirit and the scope of the invention.

I claim.

1. A process comprising contacting an aqueous emulsion consisting essentially of soybean phosphatides with one or a mixture of acids selected from the group consisting of hydrochloric, sulfuric and phosphoric acids to reduce the pH of the emulsion to a range of from about 2.0 to 4.0, as determined in a 1% emulsion, and allowing the reaction of the acid and said phosphatide to proceed at a temperature of at least about 25° C. until an acid value increase of from about 4 mg. to about 44 mg. of potassium hydroxide per gram calculated on a moisture free basis is obtained.

2. The process of claim 1 in which the moisture content of the phosphatides is between about 0.8% and 50% before the addition of the acid.

3. The process of claim 1 wherein the hydrolysis temperature is maintained from between about 25° C. to about 70° C.

4. The process of claim 1 wherein the soybean phosphatides include a natural-grade plastic unbleached soybean phosphatide having an acetone insolubles content of at least about 68%.

5. The process of claim 1 in which a basic material is added to adjust the pH subsequent to acid hydrolysis to at least about 6.5, said basic material including one or a mixture of sodium hydroxide, potassium hydroxide, calcium hydroxide, sodium carbonate, and sodium bicarbonate.

6. The process of claim 5 in which said basic material is sodium hydroxide.

7. The process of claim 5 in which the partially hydrolyzed phosphatides are dried to a moisture content of less than about 1%, and ammonia is added as the basic material to adjust the pH to at least 6.5.

8. A process for the preparation of a neutral, fluid lecithin product without the addition of fatty acids comprising contacting an aqueous emulsion of natural grade plastic unbleached soybean phosphatides with one or a mixture of acids selected from the group consisting of aqueous hydrochloric, sulfuric and phosphoric acids to reduce the pH of the emulsion to a range of from about 2.0 to 4.0, reacting the phosphatide emulsion at a temperature of at least about 25° C. until an acid value increase of at least 7.0 mg. of potassium hydroxide per gram is obtained while limiting the increase to below 44 mg. of potassium hydroxide, neutralizing a part of the acidity with one or a mixture of basic materials selected from the group consisting of sodium hydroxide, potassium hydroxide, calcium hydroxide, sodium carbonate and sodium bicarbonate, and vacuum drying the emulsion to obtain a dried product having less than about 1% moisture and a pH of at least 6.5 when measured in a 1% aqueous emulsion.

9. The process of claim 8 in which a natural-grade soybean phosphatide bleached by treatment with from about 0.1% to about 0.7% benzoyl peroxide is used in place of the natural-grade plastic unbleached soybean phosphatides.

10. The phosphatide composition obtained by the process of claim 1.

11. The phosphatide composition of claim 10 in which the pH has been adjusted to at least about 6.5.

References Cited

UNITED STATES PATENTS 2,355,081    8/1944    Julian et al. _____ 260—403

OTHER REFERENCES

D. J. Hanahan et al.: Chemical Nature of Phosphoinositides, Journal of Biological Chemistry, vol. 231, pp. 813–828 (1958).

Coulon-Morelec et al.: Effect de l'hydrogenation et de l'acide acetique chaud sur le cardiolipide. Acedémie des Sciences, Comptes Rendus, vol. 246, pp. 1936–1937 (1958).

Coulon-Morelec et al.: Etude Du Mecanisme De La Liberation Des Diglxcérides Des Phosphatides Sous L'Action De L'Acide Acétique Chaud., Bull. Soc. Chim. Biol., vol. 42, pp. 867–876 (1960).

BERNARD HELFIN, Primary Examiner

N. P. MORGENSTERN, Assistant Examiner

U.S. Cl. X.R.

252—357; 99—151, 163